(12) United States Patent
Burns et al.

(10) Patent No.: US 11,657,296 B1
(45) Date of Patent: May 23, 2023

(54) SYSTEM AND METHOD OF PORTFOLIO MATCHING

(71) Applicant: APPLIED PREDICTIVE TECHNOLOGIES, INC., Arlington, VA (US)

(72) Inventors: Bradley Philip Burns, Arlington, VA (US); Anthony Dean Bruce, Washington, DC (US); Arvind Bhusnurmath, Alexandria, VA (US)

(73) Assignee: APPLIED PREDICTIVE TECHNOLOGIES, INC., Arlington, VA (US)

( * ) Notice: Subject to any disclaimer, the term of this patent is extended or adjusted under 35 U.S.C. 154(b) by 128 days.

(21) Appl. No.: 17/197,523

(22) Filed: Mar. 10, 2021

Related U.S. Application Data

(63) Continuation of application No. 13/754,039, filed on Jan. 30, 2013, now Pat. No. 10,949,752.

(51) Int. Cl.
    *G06N 5/02* (2023.01)
    *G06Q 10/06* (2023.01)

(52) U.S. Cl.
    CPC .................................... *G06N 5/02* (2013.01)

(58) Field of Classification Search
    CPC ........... G06N 5/003; G06N 5/02; G06Q 10/06
    USPC ...................................................... 705/7.29
    See application file for complete search history.

(56) References Cited

U.S. PATENT DOCUMENTS

| | | | |
|---|---|---|---|
| 8,571,916 B1 | 10/2013 | Bruce et al. | |
| 8,914,366 B1* | 12/2014 | Li | G06F 16/35 707/739 |
| 10,949,752 B1* | 3/2021 | Burns | G06N 5/003 |
| 2005/0055275 A1 | 3/2005 | Newman et al. | |
| 2008/0052302 A1 | 2/2008 | Dolley et al. | |
| 2008/0109428 A1* | 5/2008 | Suciu | G06F 16/3346 707/999.005 |
| 2008/0294372 A1 | 11/2008 | Hunt et al. | |
| 2008/0294996 A1 | 11/2008 | Hunt et al. | |
| 2009/0018996 A1 | 1/2009 | Hunt et al. | |
| 2009/0030780 A1 | 1/2009 | York et al. | |
| 2010/0174671 A1 | 7/2010 | Brooks et al. | |
| 2012/0084117 A1 | 4/2012 | Tavares et al. | |
| 2012/0109700 A1 | 5/2012 | Cook et al. | |
| 2012/0185311 A1 | 7/2012 | Tavares et al. | |
| 2013/0124525 A1* | 5/2013 | Anderson | G06F 16/285 707/737 |
| 2013/0262465 A1* | 10/2013 | Galle | G06F 16/00 707/E17.089 |

\* cited by examiner

*Primary Examiner* — Nga B Nguyen
(74) *Attorney, Agent, or Firm* — Foley & Lardner LLP

(57) ABSTRACT

The embodiments the systems and methods described herein attempt to optimally select a group or portfolio of control locations for each test location. The optimization can be generally performed in two steps. First, an objective function is defined that scores the similarity of a set of control locations averaged together. Second, given the large number of potential solutions, a computationally-feasible algorithm that identifies an optimal set of control locations and is based on the objective function is executed. In order to obtain the optimal set of control locations in an efficient manner for use in business analytics, the algorithm may use a hill-climbing algorithm. As a result, an optimization function can be incrementally improved in an efficient manner.

20 Claims, 6 Drawing Sheets

SYSTEM AND METHOD OF PORTFOLIO MATCHING

CROSS REFERENCE TO RELATED APPLICATIONS

This application is a continuation application of U.S. patent application Ser. No. 13/754,039, filed Jan. 30, 2013, which is incorporated by reference in its entirety for all purposes.

TECHNICAL FIELD

This invention relates generally to a system and method for determining a set of control locations for a test versus control analysis.

BACKGROUND

In recent years, businesses have realized the importance of testing out proposed changes in certain test locations before rolling them out across the network. To get a clear understanding of the impact of the changes on the test sites, it becomes critical to compare the test sites with control sites where the same changes have not been made. These control sites should be as similar as possible to the test sites in order to lower the measurement error.

There are several potential strategies to determine control. One conventional approach is known as the group-to-group approach, where a certain subset of locations is designated as control locations for every test location. For example, a restaurant chain executing a promotion in Atlanta would measure the impact of the promotion by comparing a change in sales in the Atlanta market (i.e., the test group) to a change in sales over the same time in the Charlotte market, where the Charlotte market did not run the promotion (i.e., the control group). The impact of the promotion would be calculated using average sales change in the Atlanta market (test group), relative to sales change in Charlotte (control group).

The group to group approach suffers from some drawbacks. In a retail network, for example, different stores in Atlanta would likely face different environments. For example, a downtown store, a rural store, and a store near a college campus could all be in the Atlanta market but have very different operating environments. In the group to group approach, each of these stores would then be compared to the average Charlotte store. Such an approach is suboptimal because the control (e.g., the average Charlotte store) does not set an accurate baseline for expected performance for each of the test stores.

In an alternative approach known as the similar sites approach, each test location is given a set of N control locations that are most similar (using a function), where N can be determined through simulations or is an input provided by the user of the system. In this example, each store in Atlanta would be associated with its own set of N control stores. Each Atlanta store would then be tracked against its own control group. The total impact for the Atlanta promotion would then be the average of the impact of each Atlanta store relative to its control. So each site has a customized set of control sites, e.g., for a shoe retailer, the date school starts will impact sales, so the control sites should have similar seasonality. Empirical evidence through simulations has shown that this similar sites approach has a lower measurement error than the group to group approach.

SUMMARY

An approach to finding control sites for a given test site would be to find the N sites that are most similar to that test site. However, one needs to define the dimensions used to measure similarity. For example, each possible control store could be measured for how similar its sales patterns are to the test store in a period before the test runs. This approach would then pick the N sites with the best matched sales patterns. When measuring the impact of an experiment on a test site, the test site's performance is measured against the average of the similar control sites. While a significant improvement over a group to group approach, this similar sites approach is still suboptimal. In this similar sites approach, it is possible that the N most similar sites used for control, while all similar, are also all biased in the same direction. For example, if matching on sales, the N sites selected that are most similar to a given test site may all have lower sales than the test site. Therefore, while the control sites individually are most similar, the group of N control sites collectively would be biased to lower sales than the test store.

Therefore, instead of selecting sites that are individually scored as being similar sites, a more desirable approach may pick control sites that, when averaged, score most similarly to the test site. For example, rather than identify N control stores having historical performance that most closely matches the historical performance of a test store, the systems and methods described herein can identify the N control stores having historical performance that, when averaged together, most closely match the historical performance of the test store. However, when given a set of control sites and attempting to identify a subset of control sites, significant computational resources may be needed to calculate the similarity of every possible combination of control sites, and these calculations may not be feasible. For example, when given a set of 500 control sites and attempting to select 20 control sites from that set, there are about $3\times10^{35}$ different combinations of control sites.

The embodiments the systems and methods described herein attempt to optimally select a group or portfolio of control locations for each test location. The optimization can be generally performed in two steps. First, an objective function is defined that scores the similarity of a set of control locations averaged together. Second, given the large number of potential solutions, a computationally-feasible algorithm that identifies an optimal set of control locations and is based on the objective function is executed. In order to obtain the optimal set of control locations in an efficient manner for use in business analytics, the algorithm may use a hill-climbing algorithm. As a result, an optimization function can be incrementally improved in an efficient manner.

In one embodiment, a computer-implemented method of identifying a set of control locations for a particular test location comprises identifying, by a computer, a cohort of a subset of control locations from the set of control locations; determining, by a computer, a first deviation of a performance trend of the cohort of the control locations from a performance trend of the test location; selecting, by a computer, one or more control locations from the cohort; selecting, by a computer, one or more control locations from the set of control locations not in the cohort and replacing the selected one or more control locations from the cohort to form a revised cohort; determining, by a computer, a second deviation of a performance trend of the revised cohort from the performance trend of the test location; and determining, by a computer, whether the second deviation is smaller than the first deviation.

In another embodiment, a method of identifying a set of control locations most similar to a particular test location comprises identifying, by a computer, a baseline cohort of a subset of control locations from the set of control locations; calculating, by a computer, a similarity between the test location and the baseline cohort; selecting, by a computer, one or more control locations from the baseline cohort; selecting, by a computer, one or more control locations from the set of control locations not in the baseline cohort and replacing the selected one or more control locations from the baseline cohort to form a revised cohort; calculating, by a computer, a similarity between the test location and the revised cohort; and determining, by a computer, whether the revised cohort is more similar to the test location than the baseline cohort based upon calculating the similarity with the test location.

In yet another embodiment a system for selecting a control portfolio comprises a computer configured to identify a subset of control locations from the set of control locations; determine a first similarity measure of historical performance of one or more criteria between the subset of control locations and the test location over a period of time; select one or more control locations from the subset of control locations; select one or more control locations from the set of control locations not in the subset of control locations; replace the one or more selected control locations from the subset with the one or more control locations not in the subset to form a revised subset of control locations; determine a second similarity measure of historical performance of one or more criteria between the revised subset and the test location over the period of time; and determine whether the revised subset is more similar to the test location than the subset based upon the first and second similarity measures.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

A test can be an experiment that is conducted on a per location basis. A test location can be where the test is conducted. A pre-period is a time period before the test is conducted, whereas a post-period is a time period after the test is conducted.

The test location can be compared to one or more control locations. For location-based tests, matching a test location to a set of one or more control locations can improve measurement over measuring the full test group against the full control group. The performance of each test location can be compared to one or more control locations over the pre-period. The group or portfolio of control locations that a test location is compared to is referred to herein as a control cohort.

Test versus control analysis is commonly used to establish causality. Before implementing a change more broadly in the business world, the impact of that change may first be measured in a test. In some instances, the impact of an initiative may be less than the day-to-day fluctuations in financial performance. As a result, it can be valuable to make improvements to the determination of control, which can be determined by finding a group of locations that are similar to the test locations. As described in the exemplary embodiments herein, when given a test location, instead of using control locations that are each individually similar to the test location, a portfolio of control locations can be used that, as a combined unit, closely resemble the test location. A hill-climbing optimization approach can be used to solve the optimization problem of finding the best portfolio of control sites in a reasonable time.

Figure 1:
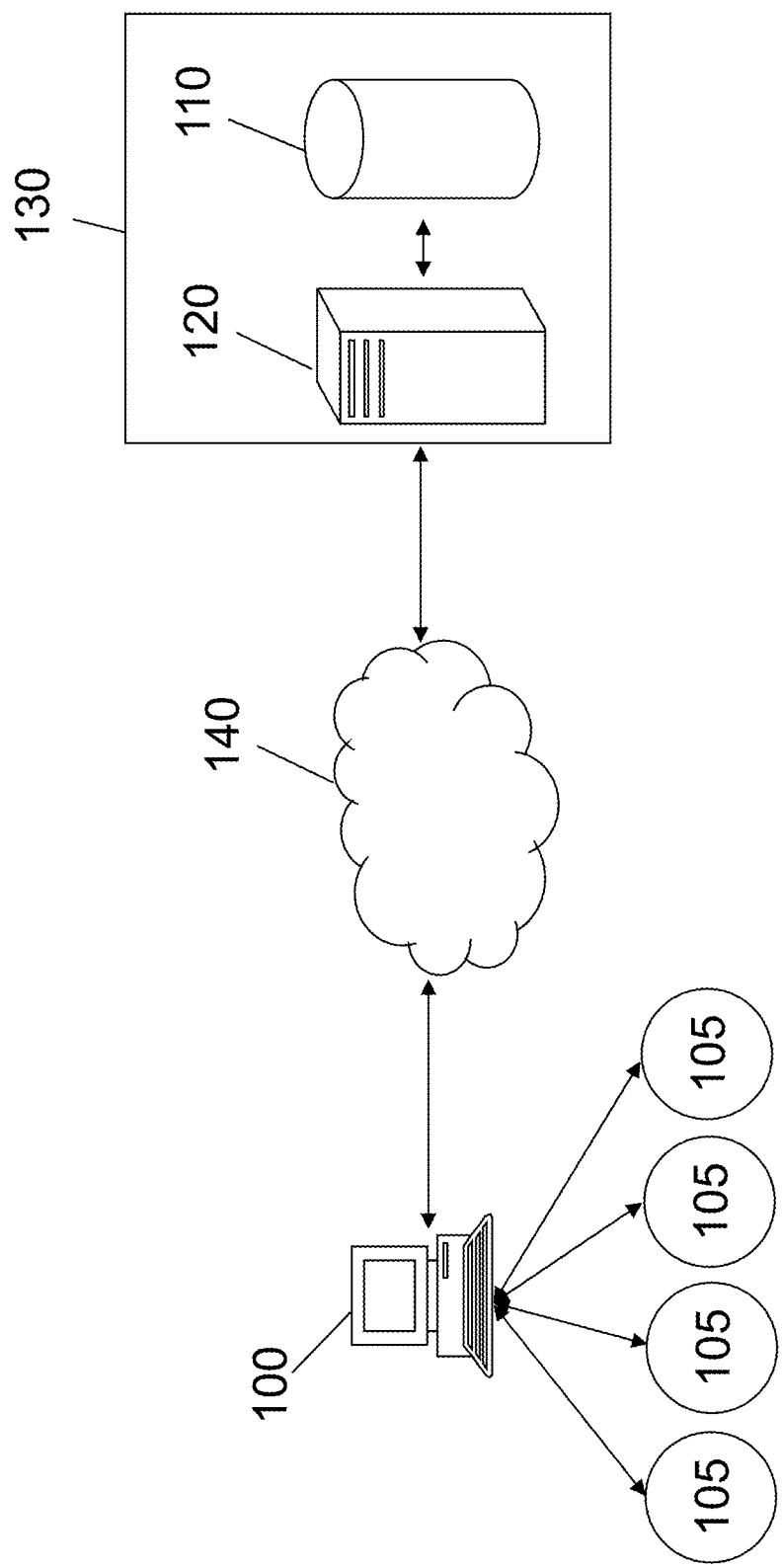
FIG. 1 shows a system overview according to an exemplary embodiment.

Referring to FIG. 1, an exemplary system diagram is shown. A client has a business network comprised of various entities 105, which may be business locations, stores, sites, students, accounts, customers, products, services, regions, patients, or other types of entities. In the exemplary embodiment, the entities represent a physical place where a company conducts business, such as a bank branch, a retail store, or a restaurant, though it is intended that the location can be any one of multiple places or sites that a company can conduct business. Further, although the exemplary embodiment often refers to the entity as a "location," it is intended that any type of entity can be used. The entities 105 may provide similar products and/or services to customers. In some embodiments, the entities 105 may be geographically dispersed.

A client computer 100 can represent one or more computers of the client, who may manage the various entities 105 or track data regarding the entities 105. In one example, for a consumer business, the client can be an organization headquarters or a marketing division for one or more entities 105 (e.g., a grocery store chain that determines which products and/or services each retailer location should provide). In some embodiments, each entity 105 can have its own client and computer 100. In other embodiment, a client and the computer 100 can be used for multiple entities 105. One or more users (not shown) may operate the computer 100. The computer 100 can be a desktop computer, workstation, laptop, personal data assistant, tablet computer, mobile phone, or any other similar computing system operated by a user. The computer 100 may use its processor to execute browser software stored in memory that enables a user to request, receive, and render information from a network 140.

The network 140 may be a shared, public, or private network and may encompass a wide area or a local area. The network 140 may be implemented through any suitable combination of wired and/or wireless communication networks. For example, network 140 may be implemented through a wide area network (WAN), local area network (LAN), an intranet, and/or the Internet. Further, network 140 may represent multiple networks, such as a wireless carrier network connected to the Internet.

The computer 100 transmits or otherwise provides historical data regarding entities 105 to a host entity 130. In this exemplary configuration, the host entity has a server 120 is coupled to the database 110, though the server 120 and the database 110 can be combined into a single device or each comprise multiple devices. The server 120 can be a computer system such as a desktop computer, workstation, or any other similar server side computing system that performs one or more service-side processes. The server 120 can have an interface unit for communicating information to and from the client's computer 100 over the network 140. In some embodiments, the server 120 may communicate with another server, such as a web server, that can more directly communicate over the network 140. The server 120 can use its processor to execute a computer program stored in memory that can access and analyze the data stored in the database 110.

The database 110 can comprise one or more memory devices that store data and/or executable software that is used by the server 120 to perform processes consistent with certain aspects described herein. The database 110 may be located external to server 120 and accessible through the network 140 or other network, such as a dedicated back-end communication path. In one embodiment, the database 110 can be located at the client or another location, such as with server 120. The database 110 can be populated with records about the client's historical data for various locations, sales, promotions, pricing, personnel, and the like. The client computer 100 can communicate with the server 120 to request analysis and view results.

In one embodiment, the client uses computer 100 to communicate over the Internet 140 with the host entity's server 120. The computer 100 may use a thin client, such as a web browser, which accesses a website hosted by the host entity 130. The client may be prompted to enter a username and password into the web browser on the computer 100. The client can be authenticated to access data and perform analysis of that data. Alternatively, the client may request that another entity, such as the host entity 130 perform the analysis of their business initiative. The systems and methods described herein can be implemented as a computer program product embodied on a computer readable medium of computer 100 or server 120, and one or more steps of the process can be implemented as a module of the computer program product.

In order to analyze a business initiative, inputs may be entered on a graphical user interface at the client computer 100 or host server 120. These inputs can assist in defining the algorithm or limit the scope of the calculations. The inputs can be entered manually on the graphical user interface and/or automatically selected and entered. Inputs can include, but are not limited to, one or more test locations, a control pool, matching criteria, a number of controls per test, and a maximum number of iterations. Inputs regarding a test location can include one or more locations where a test is going to be conducted. Input regarding a control pool can include a plurality of control locations that are potential candidates for matched control. Inputs for matching criteria can include a set of dimensions on which a test is compared to a control. A number of controls per test can be the size of a control cohort for each test location. A maximum number of iterations can be the maximum number of steps undertaken by the algorithm.

Various types of data can be used to measure the similarity of a test location to the plurality of control locations. As a starting point, given a test location and a set of matching criteria, the system aims to find the control location that most closely matches it. The system can use many different facts for matching, so the matching criteria can be used to determine which facts are most relevant.

The data used for calculating or measuring the similarity can be generally categorized as static attributes, geographic location, and financial trends. A static attribute can be a semi-permanent fact about a physical location. Stores that cater to similar demographics are likely to exhibit similar sales patterns, so static attributes may be used for these demographics. Static attributes may include, for example, the number of competitors in a one mile radius and population density in a three mile radius. These static attributes may be predictive of sales trends.

A geographic location can be identified by a location's latitude and longitude. Stores that are close to one another are likely to experience similar weather and marketing, and are likely to exhibit similar financial patterns.

A financial trend can be a performance metric, such as sales dollars that are tracked by stores over time. For example, a test location in a college town is likely to experience a decline in sales during the summer months and should often be compared with a control location that has a similar financial pattern.

Through experience and empirical evidence, matching criteria can be identified and those criteria can be weighted based on the matching of the criteria of the control locations to the test locations. So one or more of a static attribute, geographic location, and/or financial trend can be used and weighted accordingly as the criteria used in determining the similarity between the test location and a control location.

The similarity of two stores can be defined. For each criterion that is matched, a similarity function can be defined such that the more similar a pair of locations, the higher the value returned by the similarity function. Alternatively, a similarity function can be defined such that the more similar a pair of locations, the lower the value returned by the similarity function. Also, the function may vary depending upon the criteria being used.

As discussed above, a static attribute has a single numeric value per store. The variance of the attribute can be normalized. Using the mean and the standard deviation of the control population, the z-score of the test location and the control location can be computed. The absolute difference between these two scores is a similarity measure.

Assume the average value of the static attribute over the entire control pool is given by $\sigma C^a$ and the standard deviation over the entire control pool is similarly represented as $\sigma c^a$. Given a test location t where the value of the static attribute is $t^a$ and the control location c where the value is $c^a$, the distance between them on the basis of this static attribute is defined as $$D_a(t,c) = |(t^a - c^a)/\sigma C^a|$$

The geographic distance between a test location and a control location is the great circle distance. Let $\phi_t$, $\lambda_t$ represent the latitude and longitude of a test store and $\phi_c$, $\lambda_c$ be the latitude and longitude of a control store. The distance is then given by $$D_g(t,c) = \text{(radius of the earth)} * 2 * \sin^{-1}(\sqrt{\sin^2(\Delta\phi/2) + \cos\phi_t \cos\phi_c \sin^2(\Delta\lambda/2)})$$

With regard to financial trends, a test location can be compared with a control location on the basis of the patterns and similarity they exhibit over a financial metric.

Figure 2:
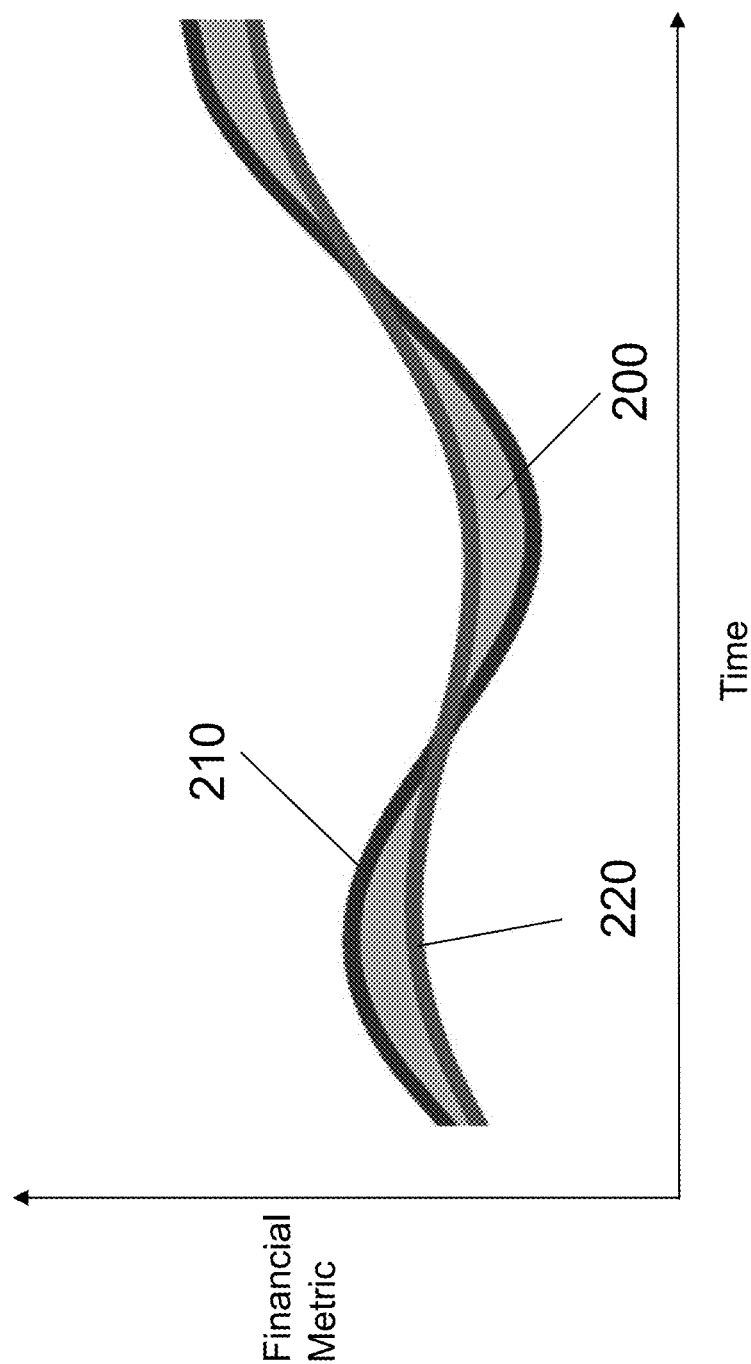
FIG. 2 shows a plot of a difference between test versus control according to an exemplary embodiment.

As shown in FIG. 2, the distance or deviation between a test location 210 and a control location 220 can be visualized by the area 200 between the financial metric curves of the test location 210 and the control location 220.

For a set of matching criteria, weighting some criteria more than others can reduce measurement error. Given the individual criterion distances, it may not be desirable that every criterion contributes equally. Consequently, the criteria can be given weights. Let $\omega$ represent the weight and D be used for the distance function. The overall similarity S, which may be inversely proportional to distance, between a test store t and a control store c can be defined by $$S(t, c) = \frac{1}{\sqrt{\sum_{i=1}^{k} \omega_k^2 D_k(t, c)^2}}$$

Given a test store and a set of control stores, a control c is picked that has the maximum value for $S(t,c)$.

For each test location, a control cohort can be used instead of identifying a single best control location or identifying the set of control locations that are similar to the test location on an individual basis. An alternative to picking the single best control location for each test location would be to pick a group of N control locations for each test location that best match the test location. The N control locations can then be averaged together for comparison to the test location. This approach can reduce measurement error relative to picking a single best control location for each test site. For example, rather than selecting the five most similar control sites for a test site, a portfolio of control sites is selected where the matching criteria averages to be the most similar to the test site. The distance between a test site and its control portfolio can be defined with respect to the various matching criteria.

The similarity can be determined with respect to a static attribute. To compare test locations and control locations on the basis of a static attribute, a normalization is performed using the control mean and standard deviation. Let the distance between a test location t and a single control location c be given by D. The distance between the test location t and the control cohort $\tilde{c}_t$ and is defined by $$D_a(t, \tilde{c}t) = \text{Avg}(D_a(t,c))$$

The similarity can be determined with respect to financial trends. Similar to the embodiment shown in FIG. 2, the area 200 can be computed under the curve, except instead of a single control location, the portfolio of the group of control locations that are matched with the current test location can be considered. A virtual average control location with financials can be defined by averaging the financials of the control cohort.

A distance can be calculated based upon a difference between the test location and the average of the control cohort. The distances can be combined with respect to the individual criterion in the weighted manner described above. The overall distance between a test store t and a control cohort $\tilde{c}$ can be expressed as $$D(t, \tilde{c}) = \sqrt{\sum_{i=1}^{p} \omega_k^2 D_k(t, \tilde{c})^2}$$

where $D_k(t, \tilde{c})$ is the distance between the test location and its control cohort with respect to the $k^{th}$ matching criterion. Again, the similarity function can be defined as the reciprocal of this distance function.

To find the best possible control, a control cohort is identified for each test store. One method would be to rank order the control locations using the similarity function and pick the top N stores, and this ranking is based upon a "greedy" approach. However, in the vast number of cases, this greedy approach does not give the best portfolio of control sites that when averaged are the most similar to the test location.

Another approach is the "brute force" approach, which involves evaluating every possible cohort and picking the best. However, combinatorics can show that this approach does not scale well. For instance, if N is set to be 10 and there are 500 candidate locations for control, then there are about $2.4 \times 10^{20}$ ways to select 10 elements from a set of 500. There is often not enough processing power and time to search the entire space of possible solutions.

The goal of portfolio matching is to select the set of control locations that minimizes the similarity function for the average of the control locations. Thus, it is desirable to use an algorithm that balances the quality of the match with the number of calculations required to compute the output.

Let C be the set of all possible control locations. Now let all the N element subsets of C be denoted as $C^N$. Then the problem of finding the best possible portfolio of control locations for the given test location t reduces to finding which one of these N element subset maximizes the value of the similarity function $S(t,c)$.

A hill-climbing approach can be used to optimize the control cohort. In the context of portfolio matching, the hill-climbing approach provides both optimization and matches business intuition.

In an analogy to geographic topology, for example, an individual in a mountainous terrain may have a goal of getting to the highest point. The individual is also provided with a GPS device that helps determine the altitude, but the individual cannot see the top of the mountain. One simple approach to get to the top would be to take a step in any direction and see if the altitude increases. If it does, the goal is being approached. If it does not, the individual should backtrack and try a different direction. Eventually, the individual would get to a point where no step increases the altitude and the individual will be at the top.

In portfolio matching, the terrain is defined by the space of all possible solutions to the optimization problem, and the altitude at any point in the terrain is defined by the corresponding similarity score. The solution space includes the mapping between the test locations and the control locations. Therefore, each step is a modification of a test versus control cohort mapping by swapping out one control location in the cohort for another location in the control pool. The algorithm will terminate when no swap of a selected control location for an unselected control location results in a higher similarity score.

Because the number of locations in the control pool can be in order of thousands, and the system may be looking for 10 to 20 control locations per test site, checking for every potential swap is usually not feasible. Therefore, a stopping criterion may be specified. The stopping criterion may cause the algorithm to stop when a certain number of swaps have been tried and the similarity function is not reduced, as discussed in further detail below. The algorithm can be expressed in pseudocode as shown below:

Pick the initial solution of the optimization problem to be the one provided by the greedy approach.
For each tin T
    Let oldScore=$S(t, C_t)$, where $C_t$ is the set of control stores that were picked as control for this test site.
    Let the set of control stores that were not picked for this test site, that is, $C-C_t$ be denoted by the set $C_t'$
    Generate a random number r in the range of 1 to N. Let $c_r$ denote the $r^{th}$ ranked control site (in terms of similarity score)
    Set numberOfSwapAttempts=0
    Set newScore=0
    While (newScore<oldScore) AND (numberOfSwapAttempts<X)
        Pick a random control site c in $C_t'$
        Let newScore=$S(t, (C_t-c_r) \cup \{c\})$ //evaluate the similarity after swapping $c_r$ with c
        $C_t=(C_t-c)_r \cup \{c\}$
        numberOfSwapAttempts=numberOfSwapAttempts+1
        oldScore=newScore
The control group corresponding to t is now given by the final value for $C_r$.

Figure 3:
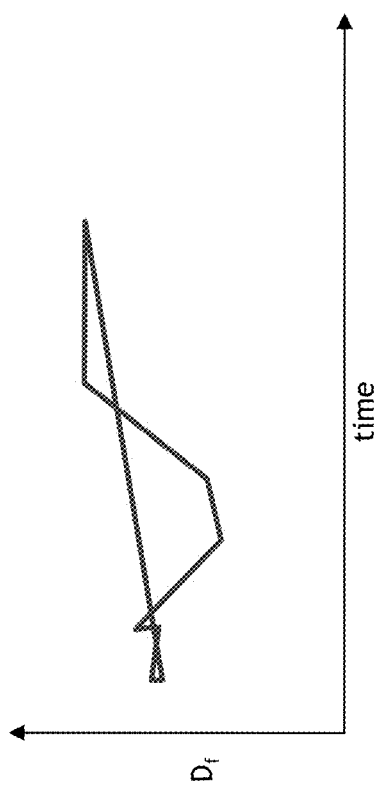
FIG. 3 shows a plot of a difference between test versus control according to an exemplary embodiment.

Referring to FIG. 3, a graph is shown that plots a difference between performance data of a financial metric (e.g., total sales) a test site and performance data of the financial metric of its portfolio set of control sites on the y-axis and time in the pre-period on the x-axis. In this example, only one criterion (e.g., financial trends) is used. This test versus control trend, represented by $D_f$, is obtained by averaging the test versus control trends for every single control location that was chosen for this test location. It is desirable to identify a set of control locations that when averaged will best match the performance trend of the test location.

Figure 4:
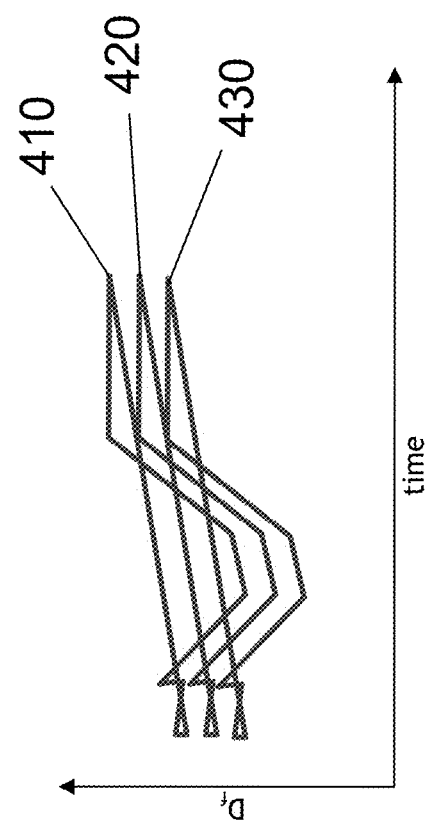
FIG. 4 shows a plot of a difference between test versus control according to an exemplary embodiment.

If trend line were separated into its constituent components each associated with control locations 410, 420, 430, under a simplifying assumption that three control locations are selected for each test location, the resulting graph might resemble the graph shown in FIG. 4. In this exemplary embodiment, the control locations selected as part of this particular test site's control group are shown as having similar financial trends.

In order to determine whether one control location should be removed in favor of adding a different control location, a hill-climbing algorithm can be applied rather than conducting an exhaustive search. By randomly removing one control location from a cohort of control locations, another control location is randomly selected from the remaining pool of control locations in the set of control locations. If the cohort with the new location (i.e., the selected subset of control locations) better matches the performance trend of the test location, then the newest cohort is used. If the cohort with the newest location does not match the performance better than the previous cohort, then the next iteration will again attempt to replace the same location in the cohort.

In one example, if three control locations are needed from a set of 500, there are over 20 million different combinations. So the system may begin with control locations A, B, and C in a baseline cohort. Location C may be randomly removed, and location D may be randomly added. If the performance of A, B, and D is better than the cohort of A, B, and C, then the A, B, and D cohort will be used instead as the baseline. In this example, if the A, B, and C cohort has a 4% deviation from the performance of the test location, then the A, B, and D cohort will replace this cohort if it has only a less than 4% deviation. But if the A, B, and D cohort has a higher than 4% deviation, then the system will attempt to replace one of the cohort of A, B, and D, selected at random, with another location from the control pool and see if the historical performance of the revised cohort more closely matches the test location. This process can be repeated until a certain level of performance is met or a certain number of iterations has occurred.

Although the exemplary embodiments describe that a single location in a cohort can be swapped with another single location in an available pool (i.e., the remaining control locations in the set of control locations), it is intended that each step can include replacing or swapping one or more locations with an equal number of locations from the pool.

Figure 5:
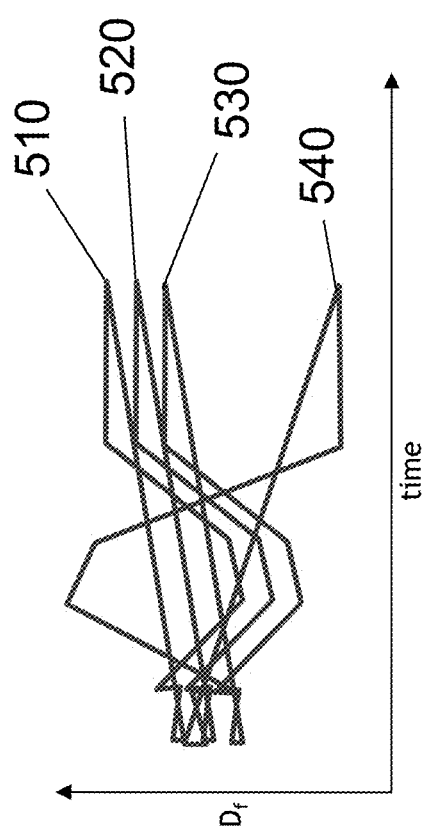
FIG. 5 shows a plot of a difference between test versus control according to an exemplary embodiment.
Figure 6:
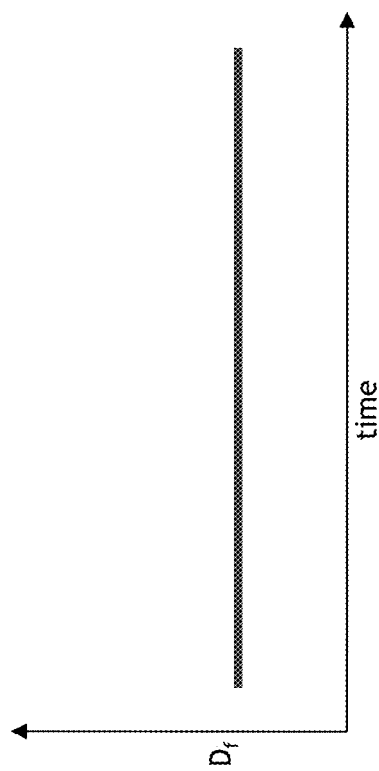
FIG. 6 shows a plot of a difference between test versus control according to an exemplary embodiment.

As shown in FIG. 5, in implementing the hill-climbing algorithm, one of the control locations 510, 520, 530 may be replaced with another control location 540. On an individual location basis, the first three control locations 510, 520, 530 are better candidates for a match than the fourth control location 540. However, if the subset of control locations (i.e., a control portfolio) included the fourth location 540 along with any two of control locations 510, 520, 530, then the average on the test versus control graph would appear much flatter, as shown in FIG. 6.

A hill-climbing algorithm may be susceptible to converging to one of the local maxima as opposed to the global maximum. Since the approach can only proceed if there exists at least one swap to the current solution that has a higher similarity score, by definition, a local maxima would be a stopping point.

The algorithm can automatically stop at a predetermined threshold and use the most closely matching cohort at that time. The predetermined threshold can be based upon a deviation from the performance of the test location. For example, the algorithm may stop once the deviation is less than 2% between the cohort performance and the test location performance over the pre-period. In an alternative, the predetermined threshold can be a number of iterations. Each time a location is replaced within a cohort and the combined performance does not improve, a counter can start, and that counter can increment for each replacement that does not improve performance. Once this counter reaches a predetermined amount, e.g., 100 or 200 iterations, then the algorithm will stop. Each time the replacement location improves the performance of the cohort, the counter will reset.

In one example, a control cohort has locations 1, 2, 3, and the remaining pool has locations 4, 5, 6. A counter starts at a zero count. The similarity of the cohort (1, 2, 3) to the test location may be 4%. Location 3 of the cohort may be randomly swapped with location 4. The resulting similarity of the cohort (1, 2, 4) is 3%. So the counter can increment to a 1 count. The location 4 may then be randomly swapped with location 5, and the resulting similarity of the cohort (1, 2, 5) is 3%. So the counter can increment to a 2 count. The location 5 may then be randomly swapped with location 6. The resulting similarity of the cohort (1, 2, 6) is 5%. The counter increases to a 3 count, but will start at zero again because of the improved similarity. Location 2 may then be swapped with location 3, and the resulting similarity of the cohort (1, 3, 6) is 3%. The counter will increase to a 1 count. Location 3 may be swapped with location 4, and the resulting similarity of the cohort (1, 4, 6) to the test location is 2%.

Although the exemplary embodiments recite that a location in the cohort can be randomly selected and replaced by a random location from the pool of control locations, it is intended that the selection and replacement can also be performed in a more ordered fashion. The more ordered fashion may be implemented to ensure that each location in the cohort has at least one attempted replacement for improved performance. Also, a more ordered fashion may eliminate a repetitive iteration of a previously-attempted replacement, but such a repetitive iteration may be negligible in a calculation of hundreds or thousands of iterations. However, a combination within a cohort can be marked and stored to prevent a future attempt of the same iteration.

In order to ensure that the process does not stop at a local maxima, a random restart feature can be incorporated. Instead of starting the algorithm at the solution provided by the initial greedy method, the algorithm can begin at other random solutions to see if there is convergence to the same value of the distance function. Given the complicated objective function that is being maximized, it is often the case that there are several local maxima. In that case, a solution can be selected that provides the maximum similarity out of all these random restarts.

The hill-climbing algorithm can also suffer from the potential danger of taking too many computations to converge. In the case of the portfolio matching algorithm, the initial solution provided by the greedy similar sites algorithm may actually be very close to the optimal solution. In some experiments using the hill-climbing algorithm, it converges within about 100 iterations.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method comprising:
calculating, by a computer, a performance trend for a cohort dataset comprising data associated with a subset of control locations of a set of control locations;

iteratively adjusting, by the computer, the cohort dataset by:
  in response to detecting a first deviation between the performance trend of the cohort dataset and a performance trend of a test location, dynamically adjusting, by the computer, the cohort dataset, such that data associated with at least one control location within the cohort dataset is dynamically replaced by data associated with at least one additional control location from the set of control locations that was not included in the cohort dataset;
  detecting, by the computer, a second deviation between a performance trend of the adjusted cohort dataset and the performance trend of the test location,
  wherein the computer continues to iteratively adjust the cohort dataset until the first and second deviations satisfy a threshold; and
executing, by the computer, a test versus control analysis protocol using the adjusted cohort dataset.

2. The method of claim 1, wherein the performance trend of the cohort dataset or the adjusted cohort dataset is based on an average of the subset of control locations within the cohort dataset or the adjusted cohort dataset.

3. The method of claim 1, further comprising:
calculating, by the computer, a similarity score between the test location and at least one control location within the adjusted cohort dataset.

4. The method of claim 1, wherein the threshold comprises a first threshold corresponding to the first deviation and a second threshold corresponding to the second deviation, wherein the second threshold is smaller than the first threshold.

5. The method of claim 1, wherein the at least one additional control location from the set of control locations is selected at random.

6. The method of claim 1, wherein the computer iteratively adjusts the cohort dataset based on a predetermined number of iterations.

7. The method of claim 1, wherein the computer identifies at least one control location within the cohort dataset or the adjusted cohort dataset based on a similarity score between the at least one control location and the test location.

8. The method of claim 1, wherein the computer identifies at least one control location within the cohort dataset or the adjusted cohort dataset based on one or more criteria corresponding to a geographic attribute of the at least one control location.

9. The method of claim 1, wherein the computer identifies at least one control location within the cohort dataset or the adjusted cohort dataset based on one or more criteria corresponding to a number of competitors within a particular geographic area.

10. The method of claim 1, further comprising:
calculating, by the computer, a baseline cohort value; and
replacing, by the computer, data associated with at least one control location in the cohort dataset or the adjusted cohort dataset when data associated with the at least one control location is more similar to the test location than the baseline cohort value.

11. A computer system comprising:
a server comprising a processor and a non-transitory computer-readable medium containing instructions that when executed by the processor causes the processor to perform operations comprising:
  calculate a performance trend for a cohort dataset comprising data associated with a subset of control locations of a set of control locations;
  iteratively adjust the cohort dataset by:
    in response to detecting a first deviation between the performance trend of the cohort dataset and a performance trend of a test location, dynamically adjust the cohort dataset, such that data associated with at least one control location within the cohort dataset is dynamically replaced by data associated with at least one additional control location from the set of control locations that was not included in the cohort dataset;
    detect a second deviation between a performance trend of the adjusted cohort dataset and the performance trend of the test location,
    wherein the processor continues to iteratively adjust the cohort dataset until the first and second deviations satisfy a threshold; and
  execute a test versus control analysis protocol using the adjusted cohort dataset.

12. The computer system of claim 11, wherein the performance trend of the cohort dataset or the adjusted cohort dataset is based on an average of the subset of control locations within the cohort dataset or the adjusted cohort dataset.

13. The computer system of claim 11, wherein the instructions further cause the processor to:
calculate a similarity score between the test location and at least one control location within the adjusted cohort dataset.

14. The computer system of claim 11, wherein the threshold comprises a first threshold corresponding to the first deviation and a second threshold corresponding to the second deviation, wherein the second threshold is smaller than the first threshold.

15. The computer system of claim 11, wherein the at least one additional control location from the set of control locations is selected at random.

16. The computer system of claim 11, wherein the processor iteratively adjusts the cohort dataset based on a predetermined number of iterations.

17. The computer system of claim 11, wherein the processor identifies at least one control location within the cohort dataset or the adjusted cohort dataset based on a similarity score between the at least one control location and the test location.

18. The computer system of claim 11, wherein the processor identifies at least one control location within the cohort dataset or the adjusted cohort dataset based on one or more criteria corresponding to a geographic attribute of the at least one control location.

19. The computer system of claim 11, wherein the processor identifies at least one control location within the cohort dataset or the adjusted cohort dataset based on one or more criteria corresponding to a number of competitors within a particular geographic area.

20. The computer system of claim 11, wherein the instructions further cause the processor to:
calculate a baseline cohort value; and
replace data associated with at least one control location in the cohort dataset or the adjusted cohort dataset when data associated with the at least one control location is more similar to the test location than the baseline cohort value.

* * * * *